United States Patent [19]

Cromley, Jr.

[11] Patent Number: 5,326,128
[45] Date of Patent: Jul. 5, 1994

[54] VARIABLE-WIDTH TORSION SPRING AXLE

[75] Inventor: John D. Cromley, Jr., Grand Rapids, Mich.

[73] Assignee: CSN Manufacturing, Inc., Grand Rapids, Mich.

[21] Appl. No.: 974,142

[22] Filed: Nov. 10, 1992

Related U.S. Application Data

[63] Continuation-in-part of Ser. No. 756,493, Sep. 9, 1991, Pat. No. 5,163,701.

[51] Int. Cl.$^5$ ................ B62D 63/06; B60B 35/10; B60G 3/14
[52] U.S. Cl. ................ 280/656; 280/700; 280/723; 180/906; 301/127; 301/128; 267/273
[58] Field of Search ............ 280/656, 638, 664, 665, 280/700, 717, 721, 723; 180/209, 905, 906; 267/273, 285; 301/128, 127

[56] References Cited

U.S. PATENT DOCUMENTS

| Re. 28,259 | 12/1974 | Henschen . | |
|---|---|---|---|
| 1,338,556 | 4/1920 | Craig . | |
| 1,480,663 | 1/1924 | Camporini . | |
| 2,082,509 | 6/1937 | Rabe . | |
| 2,149,374 | 3/1939 | Wellman . | |
| 2,160,373 | 8/1939 | Porsche . | |
| 2,163,131 | 6/1939 | Prosche . | |
| 2,169,850 | 8/1939 | Rabe . | |
| 2,662,236 | 12/1953 | Kester . | |
| 2,779,602 | 1/1957 | Kimbro et al. . | |
| 2,942,871 | 6/1960 | Kraus | 267/273 |
| 3,047,283 | 7/1962 | Kivell . | |
| 3,071,366 | 1/1963 | Loehr | 267/273 |
| 3,081,991 | 3/1963 | Swainson . | |
| 3,207,497 | 9/1965 | Schoonover | 280/723 |
| 3,330,558 | 7/1967 | Simons, Jr. | 272/68 |
| 3,625,545 | 12/1971 | Somers et al. | 280/400 |
| 3,687,479 | 8/1972 | Kober . | |
| 3,844,583 | 10/1974 | Sakow et al. . | |
| 4,194,761 | 3/1980 | Falk et al. | 280/705 |
| 4,470,616 | 9/1984 | Kaneko et al. | 280/721 |
| 4,521,033 | 6/1985 | Lenhard-Backhaus et al. | 280/700 |
| 4,544,180 | 10/1985 | Maru et al. | 280/689 |
| 4,580,808 | 4/1986 | Smith-Williams | 280/700 |
| 4,596,401 | 6/1986 | Jullien | 280/700 |

(List continued on next page.)

FOREIGN PATENT DOCUMENTS

| 0609444 | 2/1935 | Fed. Rep. of Germany | 267/273 |
|---|---|---|---|
| 881390 | 4/1943 | France . | |
| 967306 | 10/1950 | France . | |
| 0184735 | 9/1985 | Japan | 280/721 |
| 1111512 | 4/1989 | Japan | 280/717 |
| 1602285 | 11/1981 | United Kingdom | 280/656 |
| 2164608 | 3/1986 | United Kingdom | 280/656 |

OTHER PUBLICATIONS

Product brochure of rubber torsion axles published by Reliable Tool & Machine Co., Inc., Kendallville, Indiana, publication date unknown.

Primary Examiner—Margaret A. Focarino
Assistant Examiner—Peter C. English
Attorney, Agent, or Firm—Price, Heneveld, Cooper, DeWitt & Litton

[57] ABSTRACT

A suspension assembly for attaching wheel assemblies to a frame includes a pair of torsion spring subassemblies adjustably interconnected by a center axle tube to form a unitary axle-like assembly whose torsion spring subassemblies can be adjustably fixed in various desired spaced positions for connection to a selected frame having a particular width. Each torsion spring subassembly includes a torque limiter and further includes an outer tube with a bracket-like mounting member thereon for connecting the outer tube to the side beams on the frame, the bracket member being generally planar in shape and adapted to communicate forces from wheels directly through the torsion spring subassemblies to the frame in a manner that minimizes deformation when the torque limiter engages. A method comprises providing a pair of torsion spring subassemblies, releasably adjustably interconnecting the torsion spring subassemblies with a center axle member to form a unitary axle-like suspension assembly having a particular width, and connecting the suspension assembly to a frame having a particular width.

22 Claims, 3 Drawing Sheets

U.S. PATENT DOCUMENTS

| | | | |
|---|---|---|---|
| 4,637,628 | 1/1987 | Perkins | 280/689 |
| 4,723,790 | 2/1988 | Wharton | 280/700 |
| 4,744,588 | 5/1988 | Wharton | 280/700 |
| 4,807,894 | 2/1989 | Walker | 280/656 X |
| 4,834,409 | 5/1989 | Kramer | 180/906 X |
| 4,882,797 | 11/1989 | Failor et al. | |
| 4,917,402 | 4/1990 | Reynolds et al. | 280/700 |
| 4,921,231 | 5/1990 | Reynolds et al. | 280/700 X |
| 5,121,808 | 6/1992 | Visentini et al. | 180/906 X |
| 5,161,814 | 11/1992 | Walker | 280/656 X |

VARIABLE-WIDTH TORSION SPRING AXLE

This is a continuation-in-part of co-pending U.S. application Ser. No. 07/756,493 filed on Sep. 9, 1991, entitled TORSION SPRING VEHICLE SUSPENSION, now U.S. Pat. 5,163,701 issued on Nov. 17, 1992.

BACKGROUND OF THE INVENTION

The present invention relates to torsion spring suspensions, and particularly to axle suspensions for wheeled frames such as are used on trailers and other vehicles, and the like, and to a torsion spring suspension assembly having features facilitating shipment, storage, installation, and improved operation.

Solid axle suspensions incorporating leaf springs and the like are often used on trailers and other such vehicles since they are relatively inexpensive to manufacture, and relatively easy to install. Further, the way in which a trailer frame is supported on such an axle suspension tends to distribute stress to the trailer frame in a balanced and desirable manner. However, solid axle suspensions are expensive to ship since they cannot be collapsed in size for shipment. Further, a different size of solid axle must be stocked for each different trailer width, and thus large inventories and correspondingly large storage areas must be maintained.

Torsion spring suspensions offer an attractive alternative to leaf spring suspensions and solid axles since torsion spring suspensions typically offer improved handling, a smoother ride, and a lower center of gravity. Also, torsion spring assemblies do not include a long solid axle and thus less inventory is required to cover various different frame widths. However, torsion spring assemblies tend to be more costly due to the specialized parts and equipment required to manufacture them. Further, the specialized parts and equipment can lead to product inconsistency and warranty problems.

Some torsion spring assemblies utilize rubber as the torsional stress absorber. However, rubber is sensitive to temperature changes, and hence, the torsion spring assembly load ratings and spring rates of such torsion spring assemblies may vary significantly with temperature. Further, such rubber suspension can be difficult to assemble consistently since the rubber components must typically be frozen first to reduce their size by contraction. Still further, once the rubber is assembled into the torsion spring assembly, clips and brackets cannot be welded to the outer cartridge or axle tube of the assembly and the latter cannot be mounted by welding since high weld temperatures will damage the rubber. Also, such axle assemblies tend to be very heavy due to the extensive amount of high-durometer rubber they use, and thus can be expensive to ship.

Still other torsion spring assemblies utilize metal or other torsion bars instead of rubber. These assemblies typically require use of a motion limiter to control over-rotation or over-torquing of the torsion springs. However, present motion limiters transmit the over-stress condition to the torsion spring axle tube in a way that causes the axle tube to prematurely fail. For example, the motion limiter is often a polygonally shaped plate that rotates in the axle tube, pressing outwardly on the flat sides of the axle tube during over-torquing of the torsion spring assembly and potentially causing the cross-sectional profile of the axle tube to plastically deform. When this happens, the limiter may well fail, typically with disastrous consequences, and a completely new axle, or at least axle tube, is required to repair the suspension. Usually, when the axle tube is seriously damaged, substantially all of the major parts must be discarded and an entire new torsion spring assembly installed.

Thus, there is a need for a suspension assembly having the advantages of solid axles and also of torsion spring assemblies, but which is more easily shipped, stored, and installed. Further, there is a need for a suspension assembly which is adaptable to fit differently sized frames. Also, there is a need for a torsion spring subassembly that requires less specialized parts and less specialized machinery to assemble same, and which distributes stress in a manner reducing the tendency to plastically deform parts during overload and over-rotation conditions. Furthermore, there is a pronounced need for a torsion spring subassembly having a safe and completely reliable motion limiter which will operate repeatedly without damaging the assembly or impairing its ability to function properly.

SUMMARY OF THE INVENTION

A suspension assembly for attaching wheels to a frame embodying the present invention includes a pair of torsion spring subassemblies having tubular outer housings, means for connecting the torsion spring subassemblies to the frame, and means for operably mounting a wheel assembly to each torsion spring subassembly. The suspension assembly further includes means for adjustably interconnecting the pair of torsion spring subassemblies in a spaced arrangement to form an axle-like assembly whereby the pair of torsion spring subassemblies can be adjustably fixed in any of a plurality of desired spaced positions for supporting connection to a selected frame having a particular width, the width being unknown at the time of manufacture of the suspension assembly.

In another aspect of the invention, a method is provided including providing a pair of torsion spring subassemblies, each subassembly having an inner end and an outer end and further including an attachment bracket; providing a center axle tube having opposing ends, the ends being adapted to slidingly adjustably receive a portion of the pair of torsion spring subassemblies, respectively; and adjusting the pair of torsion spring subassemblies in the center axle tube to a desired spacing so as to position the brackets at a particular width adapted to receive a pair of side beams of a selected frame, the particular width of the side beams being unknown, but within a given range, at the time of manufacturing the center axle tube. The method further includes securing the pair of torsion spring subassemblies in the center axle tube to form an axle-like suspension assembly having the desired width.

These and other features, objectives and advantages of the present invention will be further understood and appreciated by those skilled in the art by reference to the following specification, claims and appended drawings.

DETAILED DESCRIPTION OF THE PREFERRED EMBODIMENTS

Figure 1:
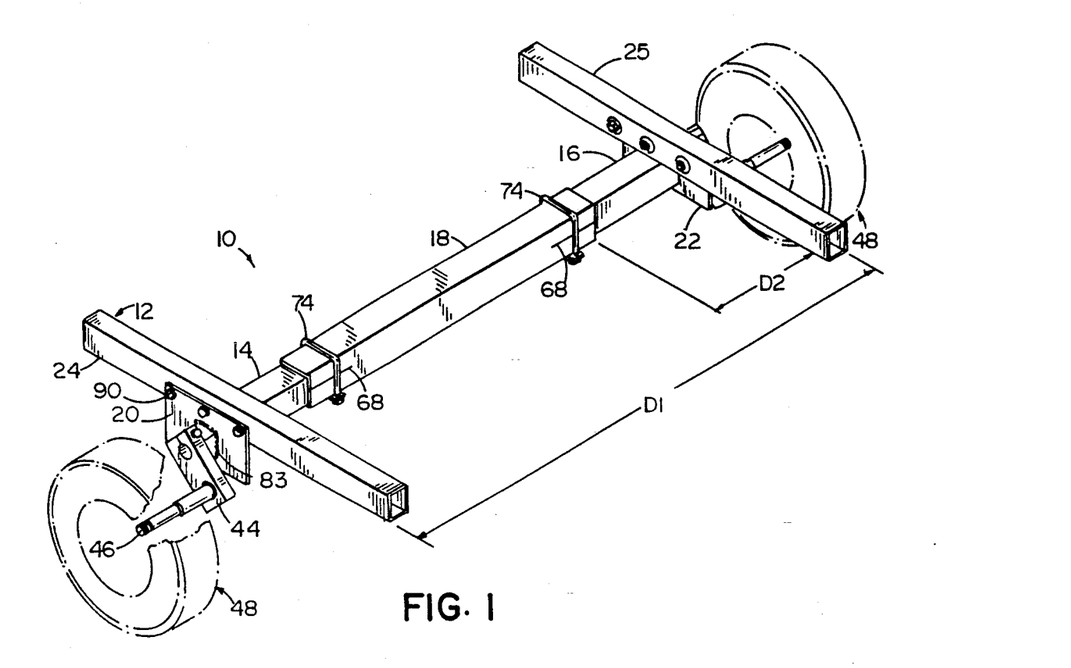
FIG. 1 is a perspective view of a suspension assembly embodying the present invention, the suspension assembly including a pair of torsion spring subassemblies and a center axle tube adjustably fixedly interconnected at a desired width to form an axle-like assembly.

A suspension assembly 10 (FIG. 1) embodying the present invention is provided for torsionally absorbing axle loads on a frame 12 or the like such as on a trailer, recreational vehicle or house trailer, although in a broad sense assembly 10 could be used practically anywhere it is desirable to suspensionally support a load. Suspension assembly 10 includes a first and a second torsional spring subassembly or cartridge 14 and 16 which, in the embodiment shown in FIG. 1, are adjustably interconnected by a center axle tube 18. Planar brackets 20 and 22 are preferably secured proximate to the outer ends of first and second torsion spring subassemblies 14 and 16, respectively, brackets 20 and 22 being adapted to be bolted to frame side beams 24 and 25, respectively, of frame 12. By telescopingly adjusting torsion spring subassemblies 14 and 16 within center axle tube 18, the spacing of planar brackets 20 and 22 can be adjusted so that suspension assembly 10 can be operably attached to any of a number of different frames having differently spaced frame side beams 24 and 25, despite the fact that the exact spacing is not known ahead of time. Thus, suspension assembly 10 can be used on a number of different types and sizes of frames, allowing standardization of parts and reduction of inventory. Further, the entire suspension assembly 10 can be shipped as separate parts, in a knocked-down condition, and the torsional subassemblies or cartridges 14, 16 may readily be shipped separately as replacement parts, thus greatly reducing shipping costs and still further reducing the size of the inventory storage area required.

Regarding torsional spring subassemblies 14 and 16, this application is a continuation-in-part of co-pending U.S. application Ser. No. 07/756,493, entitled TORSION SPRING VEHICLE SUSPENSION, filed Sep. 9, 1991, now U.S. Pat. No. 5,163,701 issued on Nov. 17, 1992, and accordingly the entire disclosure of U.S. application No. 07/756,493 is incorporated hereinafter by reference. Notably, the components of torsional spring subassmeblies 14 and 16 are contemplated to be, optimally, generally similar to the components disclosed in U.S. application Ser. No. 07/756,493, except as optionally altered in accordance with the disclosure herein. In particular, torsion rods 40, discussed below, are optimally secured to torque hub 32 and torque shaft 36 by brazing as described in U.S. application Ser. No. 07/756,493. However, it is also contemplated that alternative components, connections and subassemblies can be used and are within the scope of this invention.

Torsion spring subassemblies 14 and 16 are substantially identical except for being mirror images of each other, and therefore only torsion spring subassembly 14 will be hereinafter described. Torsion spring subassembly 14 (FIG. 3) includes an outer tube 26 having an inner end 28 and an outer end 30. A torque hub 32 is positioned mateably within inner end 28 and a bearing block 34 is positioned mateably in outer end 30 at a position spaced from torque hub 32, bearing block 34 being located at least in part within outer end 30, but also preferably including a portion 35 (FIG. 2) extending outwardly from tube outer end 30, by about one inch for example.

Figure 5:
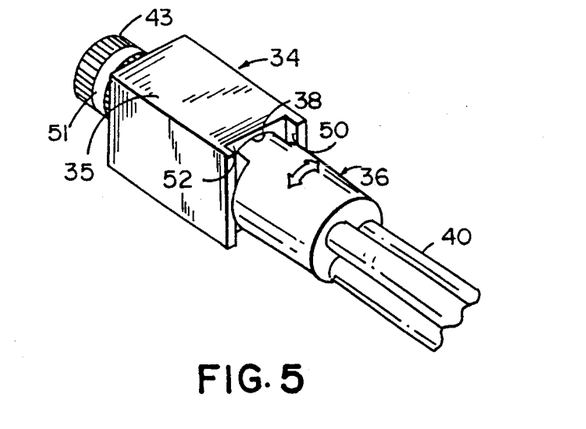
FIG. 5 is an enlarged perspective view of the torque limiter formed by the torque shaft and bearing block shown in FIG. 3.

A torque shaft 36 (FIG. 5) is operably mounted for oscillating rotational movement in a bore or passage 38 in bearing block 34. The maximum rotational movement of torque shaft 36 is limited by a torque limiter formed by stops 50, comprising the opposite ends of a diametral projection on torque shaft 36, and a configurated end on bearing block 34 which includes projecting shoulders 52, stops 50 being adapted to engage shoulders 52 when torque shaft 36 reaches a maximum desired angle of rotation. Since the rotational angle corresponds to the level of maximum torque being generated in subassemblies 14 and 16, stops 50 and shoulders 52 also limit maximum torque generated in tube 26, as discussed further below. Thus, stops 50 and shoulders 52 positively resist the over-rotation or over-torquing of torque shaft 36 in torsion spring subassembly 14.

Torque shaft 36 (FIG. 3) is operably connected to torque hub 32 by one or more torsion rods 40 which bias torque shaft 36 to a rotationally stable "home" position in bearing block 34 when frame 12 is resting on suspension assembly 10. It has been found that use of a plurality of torsion rods 40 is preferable to use of only a single rod 40 since a plurality of rods 40 tend to damp the movement of torque shaft 36 (and frame 12) more quickly than a single torsion rod 40 and subjects each rod to much less lateral deflection ("whip") under heavy loading. However, the difference between using two or more than two rods 40 has not proven to be as significant, and thus torsion spring subassemblies for heavier frames can utilize either a higher number of rods 40 of a given diameter or a lower number of rods having a larger diameter, whichever is more desirable from a purchasing and manufacturing standpoint.

Torque shaft 36 (FIGS. 3 and 5) includes a torque shaft end 42 that extends through bearing block 34 outwardly of outer tube 26, torque shaft end 42 having multiple splines 43 thereon. A trailing arm 44 includes a matingly splined aperture 45 that is connectable to torque shaft end 42 at different angles, the splines of aperture 45 being adapted to mateably engage splines 43. Trailing arm 44 further includes a laterally extending spindle 46 that is secured in trailing arm 44, spindle 46 being offset from aperture 45 and being adapted to rotatably receive and mount a wheel assembly 48 (FIG. 1). Advantageously, frame 12 can be selectively carried at different heights with respect to wheel assemblies 48 and, in turn, with respect to the ground by engaging trailing arm 44 at different rotational orientations with respect to torque shaft end 42 (compare FIGS. 1 and 6). For example, in the preferred embodiment, the respective height of frame 12 can be varied at least about 5 ½ inches. Of course, such rotational trailing arm position changes also serve to vary the torsional effects acting on the suspension, and will change the ride characteristics to some degree since they change the resultant vertical and horizontal force components produced by a given bump or undulating road surface and will therefore vary the amount of suspension movement or excursion produced by a given bump.

Trailing arm 44 (FIG. 3) includes an aperture 47 that extends tangentially to aperture 45, for receiving a retaining bolt 49. Aperture 47 positions the shaft of bolt 49 interferingly partially within aperture 45. Torque shaft 36 also includes a corresponding circumferential groove 51 in splines 43. With trailing arm 44 positioned on torque shaft 36 with torque shaft end 42 fully seated in aperture 45 and bolt 49 extended into aperture 47, the shank of bolt 49 engages groove 51 to hold trailing arm 44 securely on torque shaft 36. Further, bolt 49 is tightenable to clamp trailing arm 44 onto torque shift 36 with the splined sections mutually engaged.

Figure 4:
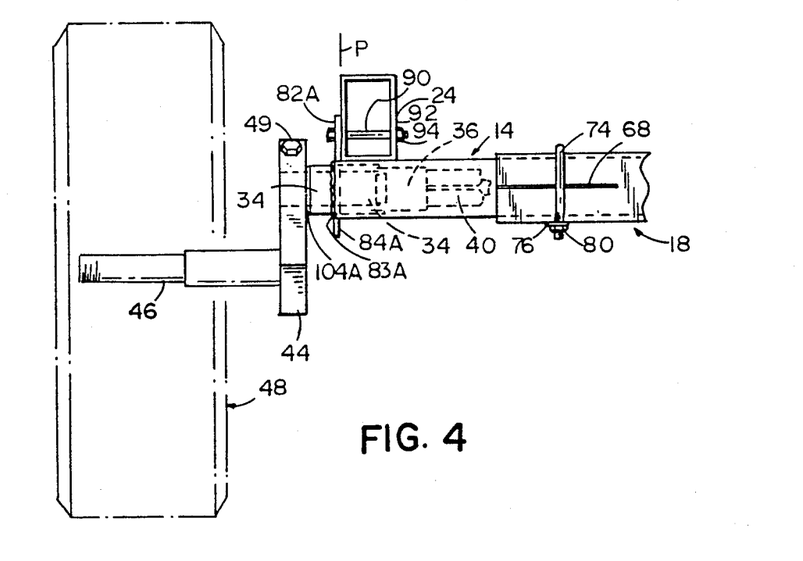
FIG. 4 is a front elevational view of a part of the suspension assembly shown in FIG. 1.

Optimally, a sleeve 100 is mounted in bore 38 in bearing block 34 and extends between the contiguous cylindrical surfaces of bearing block 34 and torque shaft 36. It is contemplated that sleeve 100 will optimally be made from a low-friction material such as nylon, or a Teflon impregnated material; however it is also contemplated that other materials could also be used. Sleeve 100 includes a cylindrical portion 102 adapted to fit within bore 38 as a bushing, and further includes a ring-like planar end portion 104 adapted to space trailing arm 44 a small distance from the side of bearing block 34. While little foreign material appears able to physically enter bore 38 during actual use, that which does so enter tends to embed itself within the wall of cylindrical portion 102 and thus not impart surface damage to the adjacent rotating parts; at the same time, this has not proved to significantly damage or impair the function of the bearing sleeve or of the overall torsion spring subassembly 14. Planar end flange portion 104 of sleeve 100 interferingly spaces the side of trailing arm 44 from the end of bearing block 34 (FIG. 4), thus reducing undesirable frictional engagement therebetween and also reducing the possibility of rust or corrosion from undesirably fusing the operative parts together. It is contemplated that cylindrical portion 102 will extend substantially the entire length of bore 38, though this is not strictly necessary in many applications. Also, it is contemplated that sleeve 100 will include a spirally extending slit 106 to facilitate installation. However, notably, the invention is contemplated to include a number of possible different sleeve arrangements and designs.

Center axle tube 18, (FIGS. 1 and 3) has a square tubular cross-sectional shape including open ends 60 and 62 which are adapted to telescopingly receive inner ends 28 of torsion spring subassemblies 14 and 16, respectively. The sidewalls 64 and 66 of tube 18 include slots 68 that extend from each end 60 and 62 longitudinally about four to five inches, thus dividing the end portions of center axle tube 18 into an upper half 70 and a lower half 72. A pair of elongate plates 76 are preferably welded to the underside of center axle tube 18 in a position midway below slots 68, plates 76 including ends that protrude laterally beyond center axle tube sides 64 and 66, with holes 75 therein. A pair of U-bolts 74 with square shoulders fit over center axle tube 18 about midway along slots 68, the U-bolts including threaded legs 78 adapted to mateably fit into holes 75. Self-locking nuts 80 are threadably engageable onto bolt legs 78, thus clamping plates 76 and U-bolts together and, in turn, clamping the upper and lower halves 70 and 72 of center axle tube 26 against the inner end portions 28 of the outer tube 26 of each torsion spring subassembly 12 and 14. This creates a secure unitary suspension assembly 10 having a complete axle-like configuration and a width which is fixed at a desired dimension by so tightening the U-bolts 74.

To adjust the width of suspension assembly 10, nuts 80 are loosened to release plates 76 and unclamp upper and lower halves 70 and 72, thus allowing the torsion spring subassemblies 14 and 16 to be slidingly adjusted to the desired width. Torsional spring subassemblies 14 and 16 may thus be adjusted laterally to any desired new position, and nuts 80 then tightened to fix such desired width.

Notably, the invention is contemplated to include a number of different methods for securing torsional spring subassemblies 14 and 16 to center axle tube 18, although the one illustrated embodiment offers the advantages of simplicity, low cost and ease of assembly. In the preferred suspension assembly 10 shown, the final width dimension can be adjusted about 20 inches, such as from 42 inches to 62 inches. Further, by use of different lengths of center axle tubes, a wide range of different frame widths can be accommodated, such as from 62 inches to 82 inches. Advantageously, components of suspension assembly 10 can be disassembled, as by removing subassemblies 14 and 16 from center axle tube 18, so that they can be shipped in a knocked-down condition or, alternatively, telescopingly slid to a minimum overall length dimension for shipment. This allows a single size of suspension assembly 10 to be used on frames of many different widths, even if the particular width is not known ahead of time.

In the most preferred form presently contemplated, the torsion spring subassemblies 14 and 16 further include planar brackets 20 and 22 (FIG. 1) for securing each subassembly to the respective frame side beams 24 and 26 in a very advantageous manner. Brackets 20 and 22 are particularly configured to communicate stress from road shock imparted to wheel assemblies 48 and torsionally transmitted through subassemblies 14 and 16 to frame side beams 24 and 25 by reinforcing the outer tube 26 and in effect providing a direct and rigid coupling of the frame to the bearing block 34. Brackets 20 and 22 are substantially identical, and hence only bracket 20 will be described. Bracket 20 (FIG. 3) is a substantially planar plate including an upper portion 82 attachable to frame 12 and a lower portion 84 which is welded to tube 26. In particular, lower portion 84 includes a square aperture 86 shaped to receive the outer end 30 of outer tube 26. Outer end 30 is extended perpendicularly through aperture 86 so that the end 30 of the tube is flush with the outer surface on bracket 20. This allows both the tube outer end 30 and bracket 20 to be welded to bearing block 34 by a single weld bead 83 (FIGS. 2 and 4), which facilitates manufacture. Upper portion 82 extends above torsion spring subassembly 14, forming a corner with tube 26 for receiving frame side beam 24 (FIG. 4), and further includes holes 88 for receiving frame attachment bolts 90.

Torsion spring subassembly 14 (and 16) is provided as a preassembled unit, with rods 40 securely connected between torque shaft 36 (FIG. 4) and torque hub 32 (FIG. 2), and with tube 26 and bearing block 34 welded to mounting bracket 20 at location 83, as noted above, with the end of outer tube 26 being extended through aperture 86 and aligned with the outermost surface of bracket 20, and with bearing block 34 extending outwardly about one inch beyond bracket 20. Torque hub 32 may also be spot welded at location 85 in tube 26 to unitize the subassemblies 14, 16, since the main torsional components, the torque hub 32, torque shaft 36 and torsion rods 40 comprise a further cartridge-like subassembly 33 (FIG. 3) which is or may be axially slidable rearwardly within and may actually be removed from tube 26 in that manner if the trailing arm retaining bolt 49 is removed. Such removability is another potentially desirable feature of the invention, however, as explained further hereinafter, and a spot weld at location 85 is therefore not essential, or even necessarily desirable, in many applications. Of course, the torsional component subassembly 33 may be retained within tube 26 in other ways as well, when desired, for example by slightly crimping the inward end 28 of the tube in one or more places to reduce its cross section somewhat. This approach will permit subsequent removal of torsion subassembly 33, by simply bending such crimped portions back out to their original positions.

Figure 2:
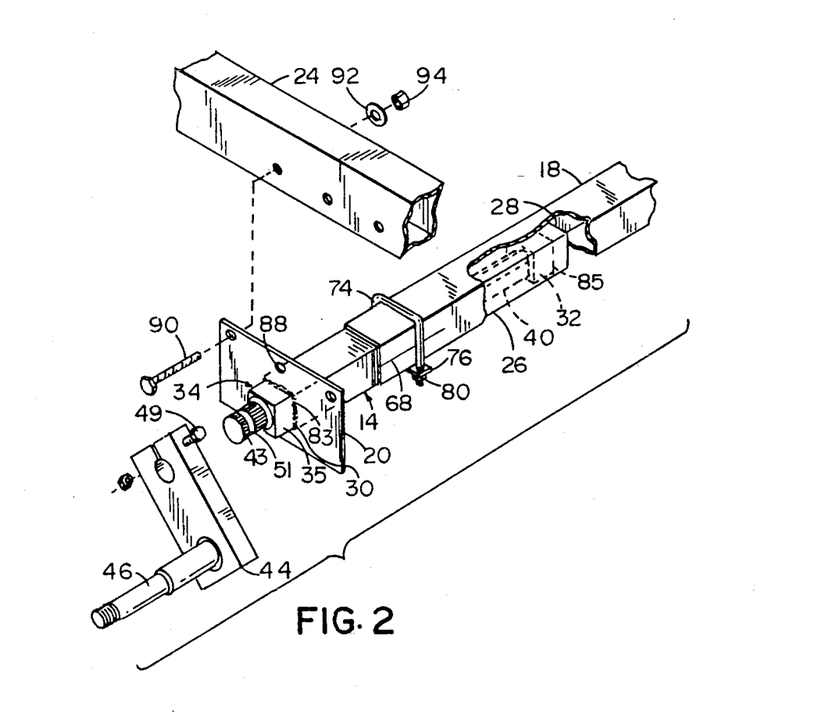
FIG. 2 is an enlarged, perspective view of a part of the suspension assembly, the center axle tube being partially broken away to expose an inner end of one of the torsion spring subassemblies and the trailing arm being exploded away to expose an outer end of the one torsion spring subassembly.
Figure 3:
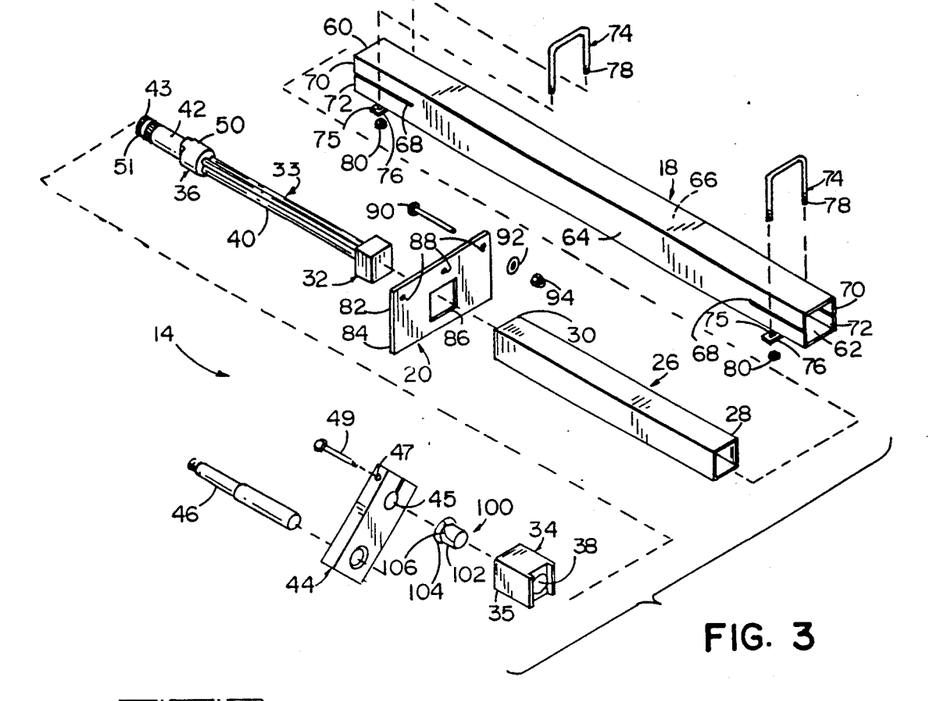
FIG. 3 is an exploded view of the torsion spring subassembly and center axle tube shown in FIG. 2.

To assemble suspension assembly 10 (FIGS. 1 and 2), subassemblies 14 and 16 are slidably positioned in center axle tube 18 under frame 12 with trailing arms 44 extending angularly toward the rear of frame 12. Subassemblies 14 and 16 are then slid toward one another in center axle tube 18, so that brackets 20 and 22 come into contact with the outside of mainframe side beams 24 and 25. Holes are then drilled in frame side beams 24 and 25 corresponding to holes 88 in brackets 20 and 22. Bolts 90 are extended through holes 88 and the corresponding drilled holes in frame side beams 24 and 25, and are secured in place with washers 92 and nuts 94 (FIG. 2). Center axle tube 18 is then centered on torsional spring subassemblies 14 and 16, and the nuts 80 are tightened upon U-bolts 74 to securely interconnect subassembly 10 into a unified, generally rigid axle-like unit.

Figure 6:
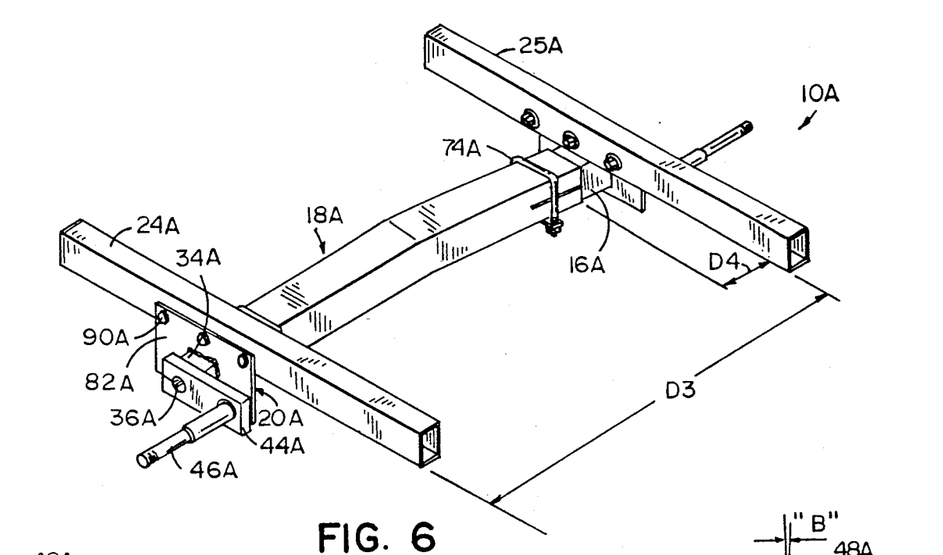
FIG. 6 is a perspective view of a modified suspension assembly in accordance with the present invention, the suspension assembly being adjusted to a narrow width and further including a modified center axle tube.

As noted, suspension assembly 10 is adjustable in width. This is best seen by comparing FIGS. 1 and 6. FIG. 1 illustrates the attachment of suspension assembly 10 to the pair of frame side beams 24 and 25 having an outer spacing of dimension D1. Reference is made to dimension D2 which represents the distance from the inside of frame side beam 25 to the end of center axle tube 18. FIG. 6 illustrates a suspension assembly 10A adjusted to a reduced width for attachment to a different pair of frame rails 24A and 25A having an outer spacing of dimension D3, dimension D3 being less than dimension D1. Reference is made to dimension D4 which is obviously less than dimension D2, and which results from telescopingly readjusting torsion spring subassemblies 14 and 16 within center axle tube 16, as previously described. While the adjustability of suspension assembly 10 constitutes a very significant advantage, another advantage of the structure involved is that an operator can readily loosen either of torsional spring subassemblies 14 and 16 from the adjacent frame and the center tube 18 and remove and replace a single torsional spring subassembly 14 or 16. Another advantage is that if an error is made in assembly or other subsequently change desired, the subassemblies 14 and 16 can readily be loosened, and resecured in a different position or at a different effective width.

During use, forces generated on wheel assemblies 48 are directly communicated to frame side beams 24 and 25 in a manner that tends to reduce deformation of parts. In particular, translational forces are communicated through a plane P (FIG. 4) through the following parts: bracket 20 (and 22), outer tube end 30, bearing block 34, and torque shaft 36. This creates a significantly improved structural arrangement for distributing load/stress to frame 12 since all of the noted parts include aligned portions lying in a single plane. This structural arrangement is particularly advantageous in use with the torque limiter arrangement discussed below. Also, the rotational forces transmitted through torsion rods 40 (i.e., in particular those forces transmitted between torque shaft 36, rods 40, torque hub 32, outer tube 26, and bearing block 34) are substantially "pure" torsional loads.

More specifically, as wheel assembly 48 encounters typical road bumps or other such unbalanced forces, the resulting force and motion are torsionally transmitted through spindle 46 and trailing arm 44 to torque shaft 36 and the internal components of torsion spring subassembly 14. As torque shaft 36 is rotated, torsion rods 40 elastically resist the rotational movement of torque shaft 36 by torquing against torque hub 32. Torque hub 32 transmits the resulting stress to outer tube 26, which transfers it to frame bracket 20, and the vehicle frame side beam 24.

If wheel assembly 48 encounters a large bump or otherwise experiences a large unbalanced force, stops 50 on torque shaft 36 engage the shoulders 52 on the configurated end of bearing block 34 to form a torque limiter, which prevents over-rotation of spindle 46. The resulting over-torque stress is then transmitted from spindle 46, trailing arm 44 and torque shaft 36 directly to bearing block 34 and, through bracket 20, directly to frame 12, with bracket 20 supporting outer tube 26 directly in the high stress area. Thus, stress is transferred directly to the wheeled frame 12 and does not result in distortion of torsion spring subassembly 14. By supporting both the inside and outside of outer tube 26 at bearing block 34, over-torque forces from the engagement of the torque limitator are in effect isolated from the torsion rods 40 and outer tube 26, and are easily resisted by the frame bracket 20 and the wheeled frame 12 without any significant likelihood of premature failure of torsion spring subassembly 14 under any normally-encountered or reasonably anticipated situation.

Figure 7:
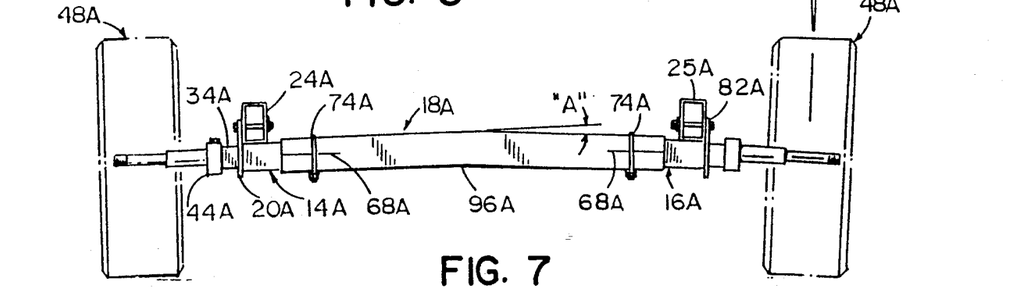
FIG. 7 is a front view of the modified suspension assembly shown in FIG. 6.

Advantageously, a modified suspension assembly 10A using a modified center axle tube 18A, can be used to set the camber (and or caster and "toe-in") of wheel assemblies 48A (FIG. 6). Modified center axle tube 18A is substantially the same as center axle tube 18, but has a bend 96A (FIG. 7) centrally located therein so that the longitudinal axes of torsional spring subassemblies 14A and 16A, and thus of their wheel-bearing spindles 46A, 46B, are positioned at a predetermined angle "A" relative to each other rather than being axially aligned. This arrangement is particularly advantageous for some frame designs where it is desirable to give wheel assemblies 48A a desired camber for load-bearing purposes, so that subassemblies 14A and 16A are optimally oriented with respect to frame 12A. In the embodiment illustrated (FIGS. 6 and 7), the wheel assemblies 48A have been set with positive camber, so that in the unloaded state, the lower edges of the wheels are slightly closer together than the upper edges (angle "B"). Notably, the camber angle is thus preset, thereby minimizing assembly errors, set-up time and subsequent adjustment. Further, different camber angles can be chosen by selecting a particular modified center axle tube having a particular angle. It is contemplated that a shim or other such spacer (not shown) can be added between upper flange 82A and the frame side rail 24A (or 25A) as needed for secure assembly and to prevent undesirable twisting of bracket 20A. As will now be understood, generally analogous horizontal angles may be formed in center tube 18A to provide desired degrees of wheel "toe-in" or "toe-out", and rotational angulation in plane P (e.g., through mounting plates 20A) will in effect provide adjustments in caster, as will rotational adjustment of trailing arm 44 relative to torque shaft 36.

Thus, a suspension assembly is provided that is readily adjustable for various widths of frames, and which is readily manufacturable, includes a reduced number of specialized parts and is in effect self-aligning for both initial installation and subsequent use. Further, a positive stop, over-torque limiter structure is provided which substantially eliminates damage from excessive torque applied thereto. Damage to torsion spring subassemblies is thus greatly minimized and at the same time repair or replacement in the field is not only made possible but greatly facilitated since an entire torsion subassembly may readily be replaced, in the unlikely event this becomes necessary, without in any way changing, loosening or disturbing the other such subassembly in a pair, and it is even simpler to replace the torsional component subassembly 33 as a cartridge, by drawing it rearwardly out of the outer tube 26 (while leaving the latter mounted in place upon the frame 12), after having simply removed the trailing arm 44 and loosened the center tube 18 and slid it in the opposite direction to provide the necessary clearance. Still further, the positive stop allows the system to function as an axle even if the torsion rods fail, thus allowing operators to continue on to their destination safely without being stranded or leaving the trailer behind. Further, the greatly simplified repairability provided by the invention not only makes service at remote locations more easily accomplished, but in addition the advantageous cartridge-like suspension subassemblies result in substantially reduced shipping times and costs, inventory costs, and installation time.

From the foregoing description of preferred embodiments, it will be readily appreciated by those skilled in the art that modifications and variations may be made without departing from the concepts underlying the invention. Such modifications are therefore to be considered as encompassed by the following claims unless these claims, by their language, expressly state otherwise.

The embodiments of the invention in which an exclusive property or privilege is claimed are defined as follows:

1. A suspension assembly for attaching wheels to a frame comprising:
    a pair of torsion spring subassemblies each including an outer tube and means for connecting the torsion spring subassemblies to the frame;
    means for operably mounting a wheel assembly to each of the torsion spring subassemblies; and
    means for adjustably interconnecting the pair of torsion spring subassemblies in mutually spaced arrangement to form a unitary axle-like assembly whereby the pair of torsion spring subassemblies can be adjusted to various desired spaced positions for connection to frames having different widths even though the particular width is unknown at the time of manufacture of the suspension assembly.

2. A suspension assembly as defined in claim 1 wherein said means for adjustably interconnecting includes a center axle tube with ends adapted to slidingly receive the inner ends of the pair of torsion spring subassemblies.

3. A suspension assembly as defined in claim 2 wherein said center axle tube ends telescopingly receive the inner ends of the pair of torsion spring subassemblies.

4. A suspension assembly as defined in claim 3 wherein said center axle tube includes ends and sidewalls, and further includes end portions with slits extending longitudinally from said center axle tube ends into said sidewalls, thus dividing the center axle tube end portions into upper and lower portions, and including means for clamping said upper and lower portions together to frictionally retain said torsion spring subassemblies in a desired spaced position.

5. A suspension assembly as defined in claim 4 wherein said means for clamping include a U-bolt.

6. A suspension assembly as defined in claim 5 wherein said center axle tube is non-rectilinear such that said center axle tube retains said pair of torsion spring subassemblies at a longitudinal angle with respect to one another which correspondingly angles the position of the wheel assemblies mounted to the torsion spring subassemblies.

7. A suspension assembly as defined in claim 2 including means for clamping said center axle tube and said torsion spring subassemblies together to retain said torsion spring subassemblies in a desired spaced position.

8. A suspension assembly as defined in claim 7 wherein said means for clamping includes U-bolts.

9. A suspension assembly as defined in claim 2 wherein said center axle tube is non-rectilinear such that said center axle tube retains said pair of torsion spring subassemblies at a longitudinal angle with respect to one another which correspondingly angles the position of the wheel assemblies mounted to the torsion spring subassemblies.

10. A suspension assembly as defined in claim 1 wherein each of said means for connecting includes a mounting member having a generally planar flange extending generally perpendicular to the longitudinal axis of the outer tubes of the torsion spring subassemblies, the flange being adapted to engage a side of the frame and to be held in place by fastener means extending through the flange and the frame side.

11. A suspension assembly as defined in claim 1 wherein the outer tubes each include an upper surface adapted to supportingly engage the frame, and wherein each of said means for connecting include a bracket attached to the outer tube, the bracket including a flange defining a corner with the respective outer tube for contiguously receiving and abuttingly retaining a frame side, together with means for attaching said frame side to said flange to secure said suspension assembly to the frame.

12. A suspension assembly as defined in claim 1 wherein the torsion spring subassemblies each include a bearing block mounted in the outer tube and having a bore, a torque shaft rotatably mounted in the bore a torque hub disposed within said tube at a predetermined distance from said torque shaft, and torsion spring means connecting the torque hub and the torque shaft, and including a sleeve located in said bore between the bearing block and the torque shaft.

13. A suspension assembly as defined in claim 12 wherein the sleeve includes a cylindrical portion located in the bore and a planar portion located between the bearing block and the means for operably mounting a wheel assembly to the torsion spring subassembly.

14. A suspension assembly as defined in claim 13 wherein the sleeve is comprised at least partially of a generally rigid polymeric material.

15. A suspension assembly as defined in claim 13 wherein the sleeve is impregnated with lubricating material.

16. A suspension assembly as defined in claim 13 wherein said sleeve is comprised of material which is adapted to embed foreign particles which come into contact with it during use.

17. A suspension assembly as defined in claim 1 wherein the torsion spring subassemblies each include a bearing block having a bore located at least partially within the outer tube, a torque shaft rotatably mounted in the bore, a torque hub disposed within said tube at a predetermined distance from said torque shaft, torsion spring means connecting the torque hub and the torque shaft, and torque limiter means coupled to the torque shaft and the bearing block for engaging and limiting over-torquing of the torque shaft.

18. A method of mounting wheel supports upon a frame, comprising:
  using a pair of torsion spring subassemblies adapted to operably support a pair of wheel assemblies, each subassembly having an inner end and an outer end and further including an attachment bracket adapted to be secured to a frame side beam;
  connecting said subassemblies by a center member disposed between them and having opposing ends, the ends being adapted to adjustably receive a portion of the pair of torsion spring subassemblies, respectively;
  adjusting the overall length of the connected torsion spring subassemblies and center member so as to position the brackets at a particular location wherein they are contiguous to the sides of a selected frame whose particular width is within a given range; and
  securing the pair of torsion spring subassemblies in place relative to said frame by connecting said brackets to said frame.

19. A method as defined in claim 18 wherein the step of securing includes securing the pair of torsion spring subassemblies to the center member.

20. A method as defined in claim 18 including the further step of removing and replacing one of the pair of torsion spring subassemblies by loosening the said one torsion spring subassembly and moving it laterally out of engagement with said center axle member, and then moving another such torsion spring subassembly into the position previously occupied by it.

21. A method as defined in claim 18 including the step of drilling a hole in the frame side in a direction parallel to the longitudinal direction of the corresponding torsion spring subassembly and bolting the bracket in place on the frame by using said hole.

22. A method as defined in claim 18 including the step of selecting a center member of angular configuration to thereby position the pair of torsion spring subassemblies at a particular angle with respect to one another, whereby wheel assemblies mounted to the pair of torsion spring subassemblies take on a given desired angular relation.

* * * * *